United States Patent
Kim et al.

(10) Patent No.: US 12,252,297 B2
(45) Date of Patent: Mar. 18, 2025

(54) VEHICLE FLUID STORAGE DEVICE AND MANUFACTURING METHOD THEREOF

(71) Applicant: KOREA FUEL-TECH CORPORATION, Anseong-si (KR)

(72) Inventors: Ki Hong Kim, Anseong-si (KR); Dong Chul Lee, Hwaseong-si (KR); Myung Keun Chae, Anseong-si (KR)

(73) Assignee: KOREA FUEL-TECH CORPORATION, Anseong-si (KR)

( * ) Notice: Subject to any disclaimer, the term of this patent is extended or adjusted under 35 U.S.C. 154(b) by 38 days.

(21) Appl. No.: 18/191,263

(22) Filed: Mar. 28, 2023

(65) Prior Publication Data
US 2023/0312180 A1    Oct. 5, 2023

(30) Foreign Application Priority Data
Mar. 29, 2022 (KR) .................. 10-2022-0039108

(51) Int. Cl.
*B65D 25/38* (2006.01)
*B29D 22/00* (2006.01)
*B65D 1/48* (2006.01)
*B65D 53/02* (2006.01)

(52) U.S. Cl.
CPC ........... *B65D 25/38* (2013.01); *B29D 22/003* (2013.01); *B65D 1/48* (2013.01); *B65D 53/02* (2013.01)

(58) Field of Classification Search
CPC .......... B65D 25/38; B65D 1/48; B65D 53/02; B29D 22/003; F17C 1/02; F17C 13/002; F17C 13/04

USPC ............................ 220/562, 560.11, 581, 592
See application file for complete search history.

(56) References Cited

U.S. PATENT DOCUMENTS

| | | | |
|---|---|---|---|
| 2005/0252548 A1* | 11/2005 | Stetson | C01B 3/0047 137/72 |
| 2018/0045370 A1* | 2/2018 | Nakashima | C22C 38/04 |
| 2019/0277451 A1* | 9/2019 | Ogiwara | B60K 15/03006 |
| 2023/0213145 A1* | 7/2023 | Woo | B60K 15/07 220/562 |

FOREIGN PATENT DOCUMENTS

| | | | | |
|---|---|---|---|---|
| CN | 113217814 A | * | 8/2021 | ............ F14C 13/002 |
| DE | 102021115689 A1 | * | 12/2022 | |
| FR | 3109620 A1 | * | 10/2021 | ............ F17C 13/002 |
| JP | 2007-155116 A | | 6/2007 | |
| JP | 2019-35442 A | | 3/2019 | |
| JP | 2021-113587 A | | 8/2021 | |
| KR | 2020286 B1 | * | 9/2019 | ............ F17C 13/002 |

(Continued)

*Primary Examiner* — J. Gregory Pickett
*Assistant Examiner* — Niki M Eloshway (57) ABSTRACT

The present disclosure provides a vehicle fluid storage device that couples a metal or aluminum connector and a plastic container and a manufacturing method thereof. The vehicle fluid storage device a storage container in which a storage space for fluid is formed and an opening is formed on one side or both sides, and an assembly including a connector disposed adjacent to the opening and forming a path through which the fluid flows into and out of the storage space, and a holder disposed between the storage container and the connector to connect the storage container and the connector, in which the storage container and the holder are coupled to each other by rotation melting.

13 Claims, 9 Drawing Sheets

(56) References Cited

FOREIGN PATENT DOCUMENTS

| KR | 10-2242337 B1 | 6/2021 | | |
|---|---|---|---|---|
| KR | 10-2021-0147214 A | 12/2021 | | |
| KR | 20220160148 A | * | 12/2022 | |
| KR | 20230040243 A | * | 3/2023 | |
| WO | WO-2017195190 A1 | * | 11/2017 | ............. B21D 51/24 |

* cited by examiner

VEHICLE FLUID STORAGE DEVICE AND MANUFACTURING METHOD THEREOF

CROSS-REFERENCE TO RELATED APPLICATIONS

This application claims the benefit of Korean Patent Application No. 10-2022-0039108, filed on Mar. 29, 2202, the contents of which are all hereby incorporated by reference herein in their entirety.

TECHNICAL FIELD

The present disclosure relates to a vehicle fluid storage device and a manufacturing method thereof, and more particularly, to a vehicle fluid storage device mounted on a vehicle and storing fluids such as gas and liquid and a manufacturing method thereof.

BACKGROUND

In general, vehicles are equipped with vehicle fluid storage devices for storing gas and liquid for various purposes. The use of these vehicle fluid storage devices is increasing due to the advantage of stably storing low-pressure and high-pressure fluids along with the development of eco-friendly energy.

A technology for a conventional fluid storage device has already been disclosed in "Korea Patent No. 10-2242337 (high-pressure gas storage pressure vessel manufacturing device, Apr. 14, 2021)". The registered patent is characterized by implementing excellent pressure resistance performance by reinforcing rigidity.

However, most of the conventional fluid storage devices are made of metal or aluminum to ensure stability. However, the fluid storage device made of metal and aluminum has problems in that it is difficult to mount in a vehicle due to excessive weight and excessive manufacturing cost. In addition, there are many limiting factors in securing space when mounting in a vehicle. Accordingly, there is a need for a vehicle fluid storage device made of plastic, but it is difficult to overcome instability.

SUMMARY

The present disclosure provides a vehicle fluid storage device in which a metal or aluminum connector and a plastic container are coupled, and a manufacturing method thereof.

According to an aspect of the present disclosure, there is provided a vehicle fluid storage device including: a storage container in which a storage space for fluid is formed and an opening is formed on one side or both sides; and an assembly including a connector disposed adjacent to the opening and forming a path through which the fluid flows into and out of the storage space, and a holder disposed between the storage container and the connector to connect the storage container and the connector, in which the storage container and the holder are coupled to each other by rotation melting.

The storage container and holder may include a plastic material, the connector may include at least one material of metal and aluminum, and the connector and the holder may form the assembly by insert injection.

The storage container may be formed by blow molding.

The vehicle fluid storage device may further include a reinforcing layer disposed to surround at least one region of the storage container and the assembly to reinforce strength, in which the reinforcing layer may include at least one of a carbon fiber composite material and a glass fiber composite material.

The holder may include a storage container support region disposed to surround at least one region of the storage container, a connector support region extending from the storage container support region and disposed to surround at least one region of the connector, and a connection region disposed between the storage container support region and the connector support region.

A burr accommodation space is formed between the outer wall of the storage container and the storage container support region to accommodate the burrs generated in the rotation melting.

the burr accommodation space may include a step formed at one end of the holder forming the connector support region.

At least one connection protrusion for coupling the connector and the holder may be included between the connector support region and the connector.

The connector may include a connector body disposed adjacent to the opening, and a connector coupling portion extending from the connector body, and an insertion protrusion for coupling the connector and the holder may be included in the connector coupling portion and the connection region of the holder.

The connector coupling portion may further include a support protrusion protruding from an outer wall of the connector coupling portion, and the connector support region may surround the connector so that the support protrusion is exposed.

The support protrusion may be used as a rib for fixing a jig in the rotation melting.

The storage container may include an insert ring adjacent to a rotational melting region of the storage container and the holder.

The insert ring may be provided in the opening to prevent deformation of the opening in the rotation melting of the storage container and the holder.

The insert ring may include at least one of plastic, metal, and aluminum.

The vehicle fluid storage device may further include a connector connecting portion connected to the connector to connect the storage space and an external device.

An O-ring for maintaining airtightness between the connector and the connector coupling portion may be disposed between the connector and the connector coupling portion.

At least one region of the storage container may be provided in an oval shape.

According to another aspect of the present disclosure, there is provided a manufacturing method of a vehicle fluid storage device including a storage container in which a storage space for fluid is formed and an opening is formed on one side, and an assembly including a connector disposed adjacent to the opening and forming a path through which the fluid flows into and out of the storage space and a holder disposed between the storage container and the connector to connect the storage container and the connector, the manufacturing method including: manufacturing of the storage container and the assembly; and coupling the storage container and the holder of the assembly by rotation melting.

According to still another aspect of the present disclosure, there is provided a vehicle fluid storage device assembly including a plurality of vehicle fluid storage devices, in which each vehicle fluid storage device includes a storage container in which a storage space for fluid is formed and an opening is formed on one side, and an assembly including a connector disposed adjacent to the opening and forming a path through which the fluid flows into and out of the storage space and a holder disposed between the storage container and the connector to connect the storage container and the connector.

The vehicle fluid storage device assembly may further include a fluid line connection portion connecting the plurality of vehicle fluid storage devices and an external device, in which the fluid line connection portion includes a branch pipe connected to each storage space of the plurality of vehicle fluid storage devices and a connection pipe connecting the branch pipe and the external device.

According to the vehicle fluid storage device and the manufacturing method thereof according to the present disclosure, it is possible to reduce weight and a manufacturing cost while securing stability by coupling the metal or aluminum connector and the plastic container.

According to the vehicle fluid storage device and the manufacturing method thereof according to the present disclosure, it is possible to couple a plurality of vehicle fluid storage devices and increase a fluid storage capacity, and to easily arrange and mount the vehicle fluid storage devices in accordance with various types of mounting spaces such as internal combustion engines and electric vehicles.

Technical effects of the present disclosure as described above are not limited to the effects mentioned above, and other technical effects not mentioned will be clearly understood by those skilled in the art from the description below.

DETAILED DESCRIPTION

Hereinafter, embodiments of the present disclosure will be described in detail with reference to the accompanying drawings. However, the embodiments are not limited to embodiments disclosed below and may be implemented in various forms, and the embodiments are provided to complete the disclosure of the present disclosure and to fully inform those skilled in the art of the scope of the invention. The shapes of elements in the drawings may be exaggeratedly expressed for more clear description, and elements indicated by the same reference numerals in the drawings mean the same elements.

Figure 1:
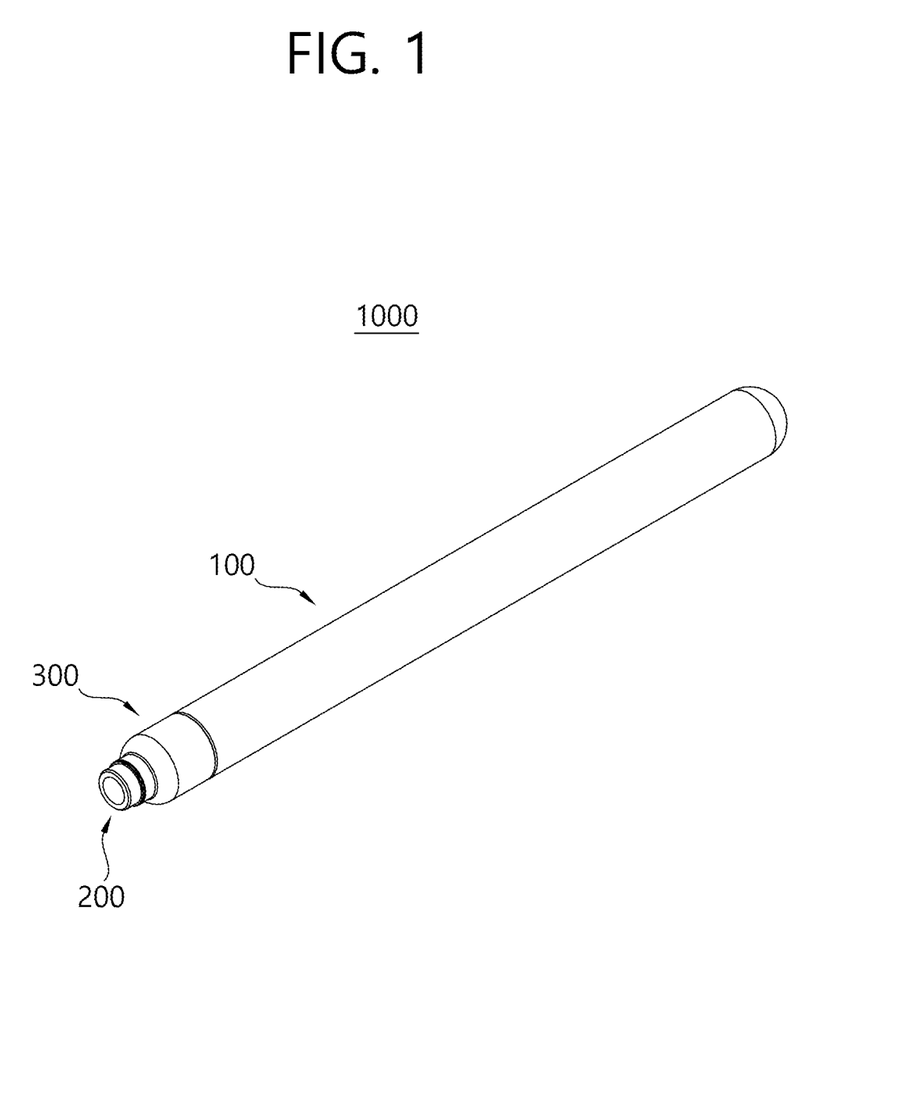
FIG. 1 is a schematic perspective view of a vehicle fluid storage device according to a first embodiment.
Figure 2:
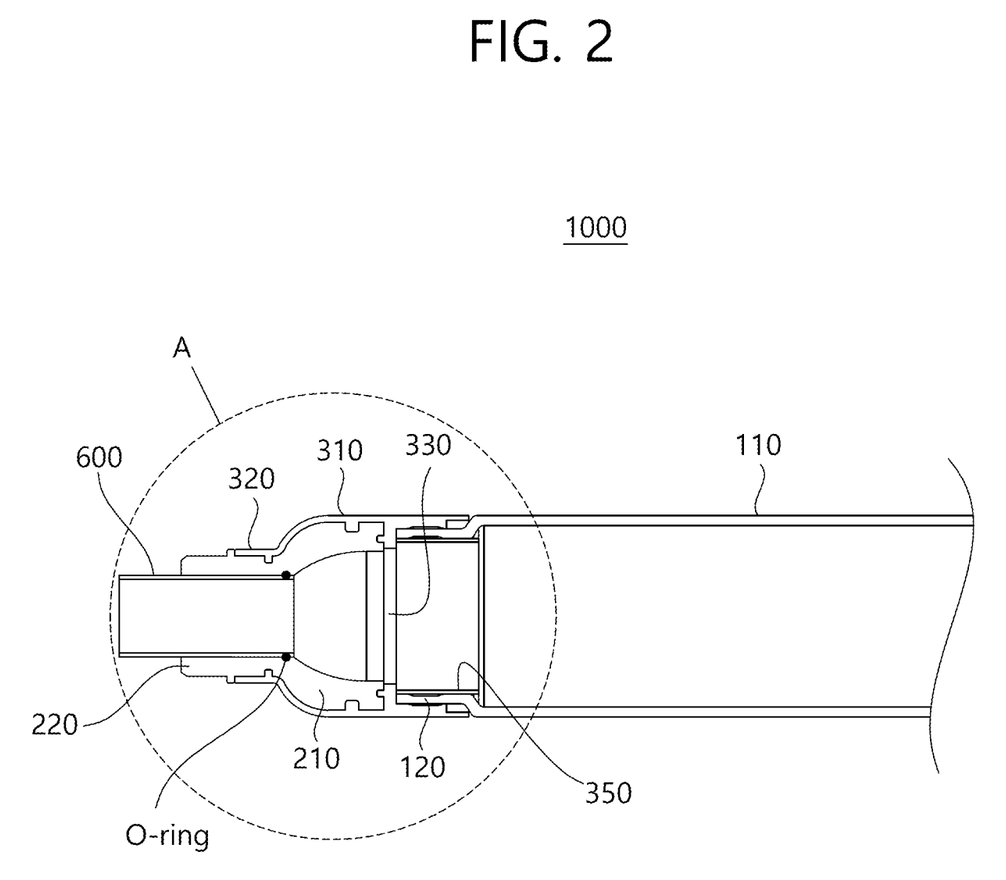
FIG. 2 is a schematic cross-sectional view of the vehicle fluid storage device according to a first embodiment.
Figure 3:
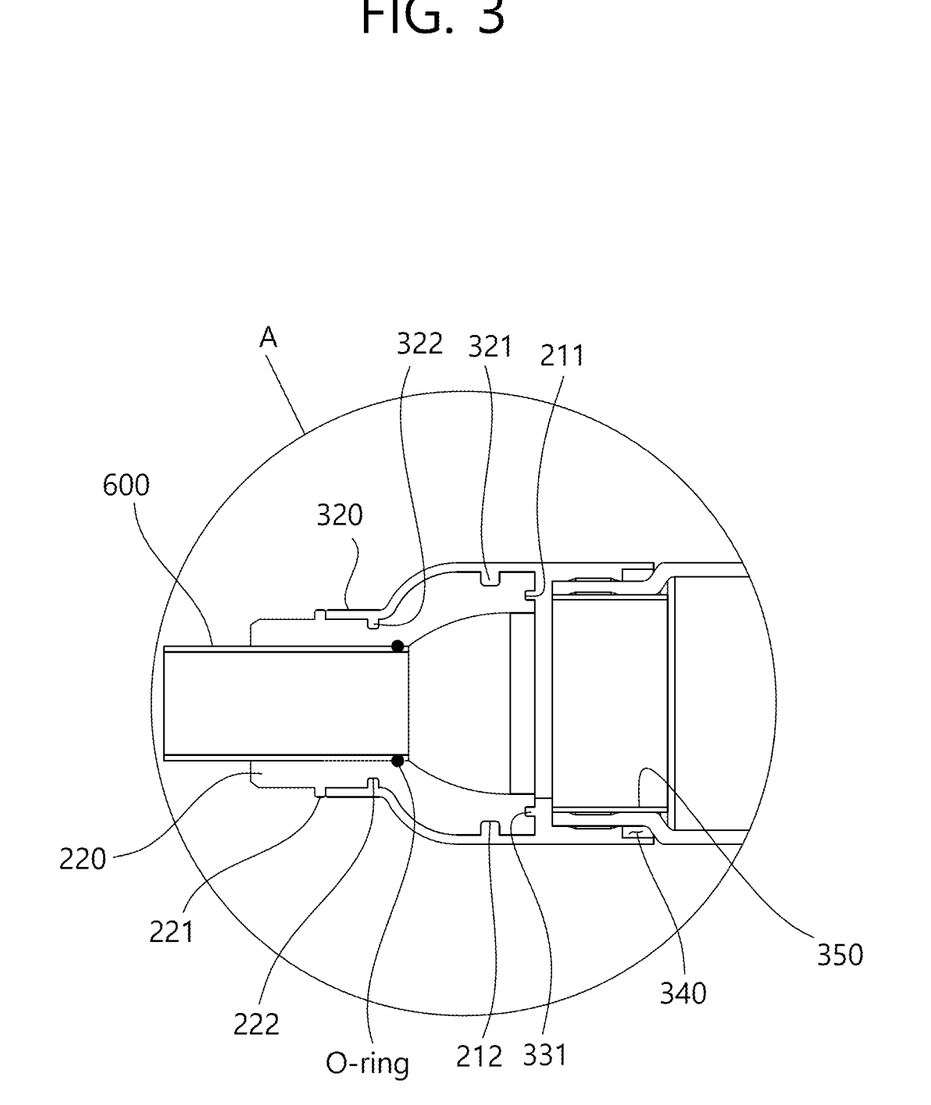
FIG. 3 is an enlarged view of "A" of the vehicle fluid storage device according to the first embodiment illustrated in FIG. 2.

FIG. 1 is a schematic perspective view of a vehicle fluid storage device according to a first embodiment, and FIG. 2 is a schematic cross-sectional view of the vehicle fluid storage device according to a first embodiment. FIG. 3 is an enlarged view of "A" of the vehicle fluid storage device according to the first embodiment illustrated in FIG. 2.

As illustrated in FIGS. 1 to 3, a vehicle fluid storage device 1000 (hereinafter referred to as a storage device) according to the first embodiment may be a low-pressure storage device.

This storage device 1000 includes a storage container 100, a connector 200, and a holder 300.

The storage container 100 forms a space in which fluid is stored. The storage container 100 is made of a plastic material such as nylon and may have a long cylindrical shape or partially elliptical shape in one direction. However, this is for explanation of the present embodiment, and the shape of the storage container 100 is not limited, and the storage container 100 partially having an elliptical shape may be provided to prevent rotation and support during rotation melting.

Figure 9:
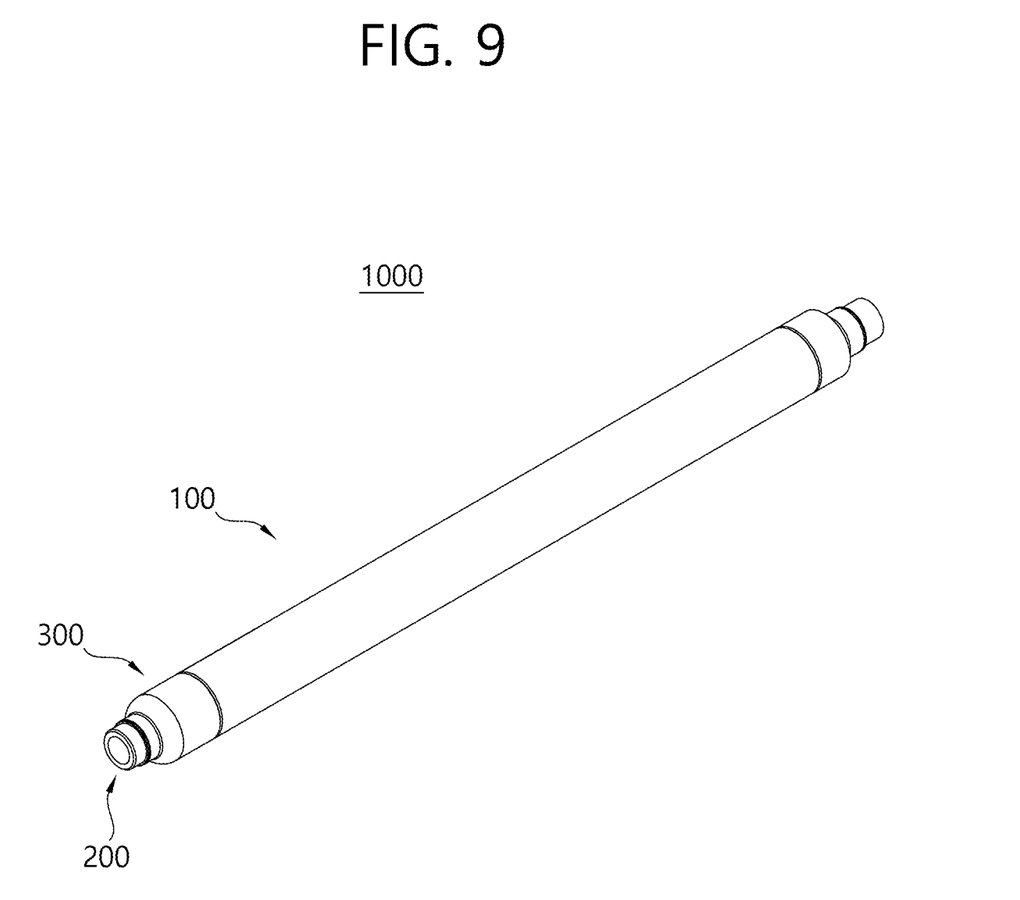
FIG. 9 is a perspective view schematically illustrating openings formed on both sides of the vehicle fluid storage device according to the first embodiment.

Here, one side of a container body 110 of the storage container 100 may have a closed shape, and an opening 120 may be formed on the other side to allow fluid to flow in and out. However, this is for explanation of the present embodiment, and as illustrated in FIG. 9, openings may be formed on both sides of the container body 110.

Here, the opening 120 is provided in a cylindrical shape and extends from the other side of the storage container 100, and may have an outer diameter smaller than that of the container body 110. Moreover, an inner diameter of the opening 120 may be provided smaller than an inner diameter of the container body 110.

The connector 200 is connected to the storage container 100 by the holder 300. The connector 200 is connected to an external device of the storage container 100 to form a path through which fluid is supplied. The connector 200 is made of metal or aluminum, and a hole communicating the external device and the storage container 100 is formed therein.

The connector 200 may include a connector body 210 and a connector coupling portion 220.

The connector body 210 is disposed adjacent to the opening 120, and the connector coupling portion 220 may be provided in a form extending from the connector body 210 toward the front. In this case, the connector body 210 may have a curved shape in a central direction toward the connector coupling portion 220 from one region adjacent to the holder 300.

Here, an inner diameter of the connector body 210 may decrease toward the connector coupling portion 220. In addition, the size of the inner diameter adjacent to the opening 120 may be smaller than the inner diameter of the opening 120. Moreover, the inner diameter of the connector coupling portion 220 may have the same size as the inner diameter of the connector body 210 having a reduced inner diameter.

Meanwhile, a first insertion groove 211 and a second insertion groove 212 may be formed in the connector body 210.

The first insertion groove 211 may be depressed in the direction of the holder 300 from one end of the connector body 210 facing the holder 300 to be coupled with the holder 300. Moreover, the second insertion groove 212 may be recessed in an outer wall of the connector body 210. The second insertion groove 212 is formed along a periphery of the connector body 210 so that the holder 300 and the connector body 210 are coupled to each other.

In addition, a support protrusion 221 and a third insertion groove 222 may be formed in the connector coupling portion 220.

The support protrusion 221 may protrude from the outer wall of the connector coupling portion 220. The support protrusion 221 may be formed along the periphery of the connector coupling portion 220 to support the holder 300. Moreover, the third insertion groove 222 may be recessed in the outer wall of the connector coupling portion 220 between the support protrusion 221 and the connector body 210. The third insertion groove 222 is formed along the periphery of the connector coupling portion 220 so that the holder 300 and the connector coupling portion 220 are coupled to each other.

In addition, the holder 300 is disposed between the storage container 100 and the connector 200 to connect the storage container 100 and the connector 200. The holder 300 is made of a plastic material such as nylon and may be provided in a form surrounding at least one region of each of the opening 120 and the connector 200.

Moreover, a screw shape may be provided on the inside or outside of the connector coupling portion 220, so that the connection coupling portion 220 may be coupled with an external fluid supply line connection portion (not illustrated) for supplying fluid.

Moreover, the holder 300 may include a storage container support region 310, a connector support region 320, and a connection region 330.

The storage container support region 310 is provided in a form surrounding the opening 120, and one end may have a form extending toward the connection region between the container body 110 and the opening 120. Here, a burr accommodating space 340 is formed between the inner wall of the holder 300 and the outer wall of the opening 120 in the storage container support region 310.

The burr accommodation space 340 may be provided with a step in a direction from one end of the storage container support region 310 to the other, a space in which burrs generated from melting between the holder 300 and the container body 110 are accommodated is formed, and thus, deformation caused by the step can be suppressed. In addition, an insert ring 350, which can be made of a material such as plastic, metal, or aluminum, can be inserted into the opening to improve deformation of the opening when melting the holder 300 and the container body 110.

In addition, the connector support region 320 extends from the storage container support region 310 with the connection region 330 interposed therebetween and is provided in a form surrounding the connector 200. In this case, the connector support region 320 extends so that one end is in close contact with the support protrusion 221 of the connector coupling portion 220 in a form surrounding the connector body 210 including the curved shape and the connector coupling portion 220.

Moreover, a first connection protrusion 321 and a second connection protrusion 322 may be formed in the connector support region 320. The first connection protrusion 321 is inserted into the second insertion groove 212 and the second connection protrusion 322 is inserted into the third insertion groove 222 so that the connector 200 and the holder 300 are fixed.

Moreover, the connection region 330 is provided between the storage container support region 310 and the connector support region 320 to cross the storage container 100 and the connector 200. A connection protrusion 331 inserted into the first insertion groove 211 is provided on the front of the connection region 330, and can be connected to the connector 200. In this case, a hole communicating between the storage container 100 and the internal space of the connector 200 may be formed in the connection region 330, and the hole is formed so that an inner diameter thereof is smaller than that of the opening 120 and is larger than the inner diameter of the connector body 210.

In this way, in the storage device 1000 according to the first embodiment, the connector 200 formed of metal or aluminum is coupled to the storage container 100 made of plastic through the holder 300 made of plastic, and thus, it is possible to reduce weight.

Hereinafter, a manufacturing method of the vehicle fluid storage device according to the first embodiment will be described in detail with reference to the accompanying drawings. However, detailed descriptions of the above-described components will be omitted and the same reference numerals will be given for description.

Figure 4:
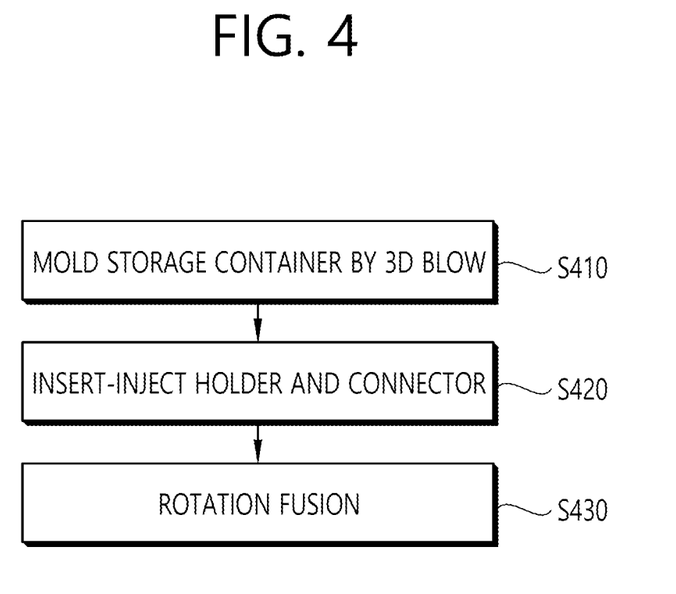
FIG. 4 is a flowchart illustrating a manufacturing method of the vehicle fluid storage device according to the first embodiment.

FIG. 4 is a flowchart illustrating the manufacturing method of the vehicle fluid storage device according to the first embodiment.

As illustrated in FIG. 4, in manufacturing the storage device according to the first embodiment, a low-pressure storage device may be formed.

First, in manufacturing the storage device 1000, the storage container 100 is formed. In this case, the storage container 100 may be formed by blow molding (S410). Then, an assembly 400 (hereinafter, an injection assembly) of the connector 200 and the holder 300 is manufactured. In this case, the connector 200 made of metal or aluminum and the holder 300 made of plastic may be coupled by insert injection to form the injection assembly 400 (S420).

Then, the storage container 100 and the injection assembly 400 are coupled by rotation melting (S430). In this case, the support protrusion 221 formed on the connector coupling portion 220 may be used as a rib for fixing a jig in the rotation melting.

The storage container and the injection assembly may be connected to a connector coupling portion 600 that can be connected to a fluid supply line after the coupling by the rotation melting.

Meanwhile, burrs may occur in rotation melting of the storage container 100 and the injection assembly 400. In this case, the generated burrs are accommodated in the burr accommodation space 340 formed in the storage container support region 310, and thus, it is possible to prevent deformation of the external appearance of the storage container 100.

In addition, during the rotation melting of the storage container 100 and the injection assembly 400, the insert ring 350 is reflected on the inner surface of the storage container 100 to support the inner surface of the storage container 100 during melting to reduce deformation and melting force.

Hereinafter, a vehicle fluid storage device according to another embodiment will be described in detail with reference to the accompanying drawings. However, detailed descriptions of the above-described components will be omitted and the same reference numerals will be given for description.

Figure 5:
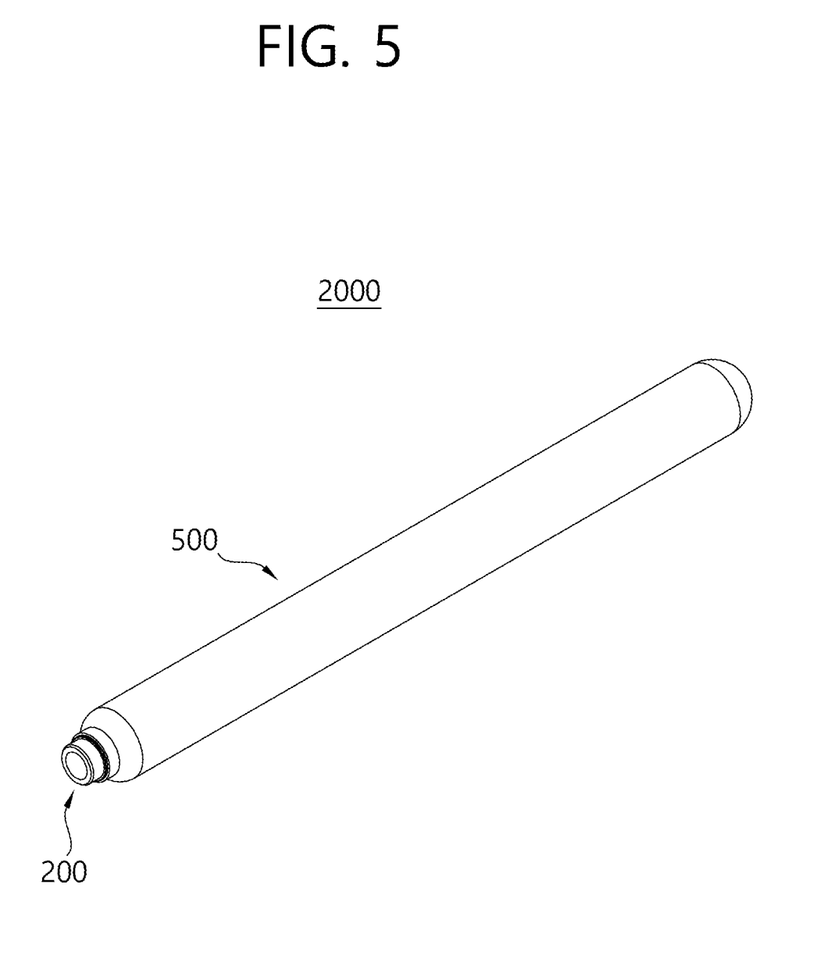
FIG. 5 is a schematic perspective view of a vehicle fluid storage device according to a second embodiment.
Figure 6:
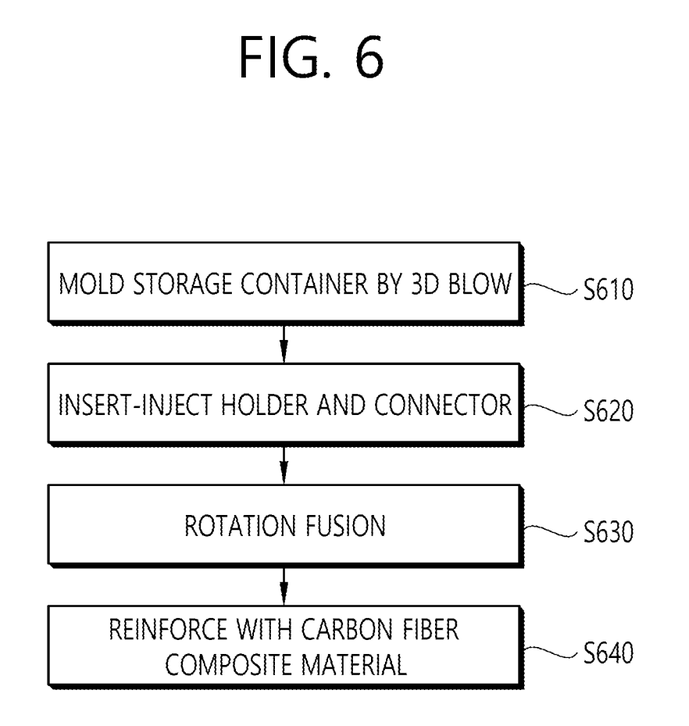
FIG. 6 is a flowchart illustrating a manufacturing method of the vehicle fluid storage device according to the second embodiment.

FIG. 5 is a perspective view schematically illustrating a vehicle fluid storage device according to a second embodiment, and FIG. 6 is a flowchart illustrating a manufacturing method of the vehicle fluid storage device according to the second embodiment.

As illustrated in FIGS. 5 and 6, the vehicle fluid storage device according to the second embodiment may be a high-pressure storage device.

A storage device 2000 includes a storage container 100, a connector 200, a holder 300, and a reinforcing layer 500.

The storage container 100, the connector 200, and the holder 300 may be formed in the same form as the storage device 1000 described in the first embodiment. However, the storage device 2000 according to the second embodiment may further include the reinforcing layer 500. The reinforcing layer 500 may include a carbon fiber composite material or a glass fiber composite material, and may be formed to cover the entire outer shape of the storage container 100 and the connector 200.

In the manufacture of the high-pressure container, first, the storage container 100 is formed. In this case, the storage container 100 may be formed by blow molding (S610). Then, an injection assembly 400 of the connector 200 and the holder 300 is manufactured. At this time, the connector 200 made of metal or aluminum and the holder 300 made of plastic may be coupled to each other by insert injection to form the injection assembly 400 (S620).

Then, the storage container 100 and the injection assembly 400 are coupled to each other by rotation melting (S630).

After that, the storage container and the injection assembly 400 are coupled to each other by the rotation melting, and if necessary, a connector coupling portion 600 that can be connected to a fluid supply line connection portion may be coupled, and an O-ring may be added to improve air-tightness performance when the connector 200 and the connector coupling portion 600 are coupled to each other. In addition, during the rotation melting of the storage container and the injection assembly, an insert ring 350 is applied to the inner surface of the storage container to support the inner surface of the storage container during melting, thereby reducing deformation and melting force.

After that, the reinforcing layer 500 may be formed to cover the entire outer shape of the storage container 100, the entire region of the holder 300, and a partial outer shape of the connector 200 (S640).

In the formation of the reinforcing layer 500, a reinforcing force of the reinforcing layer 500 may decrease when there is deformation due to rotation melting of the storage container 100 and the injection assembly 400. However, as described above, the storage device 2000 prevents deformation due to rotation melting due to the burr accommodation space 340 formed between the inner wall of the holder 300 and the outer wall of the opening 120, and there is an advantage in preventing functional deterioration of the reinforcing layer 500 due to the step.

Figure 7:
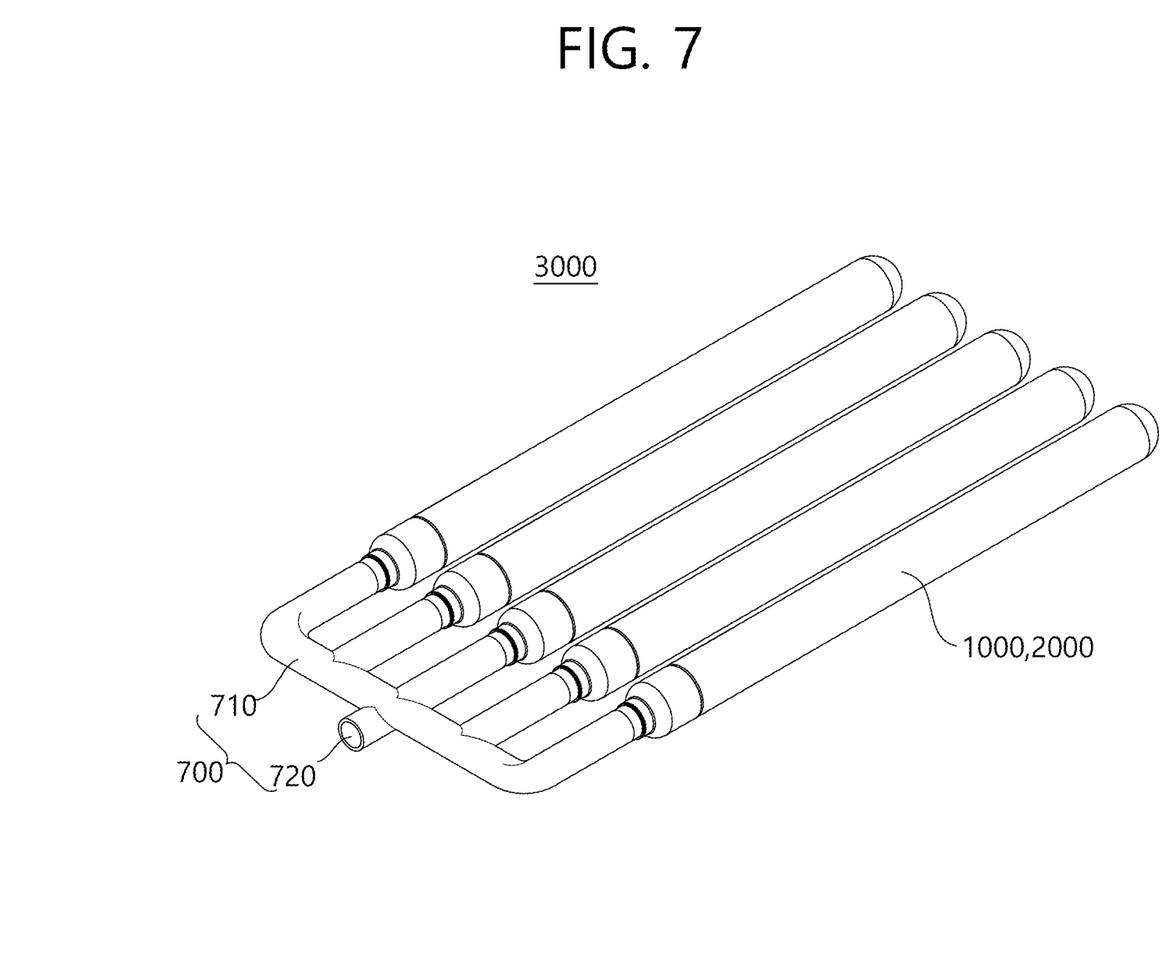
FIG. 7 is a perspective view schematically illustrating an assembly of a vehicle fluid storage device according to a third embodiment.

Meanwhile, if necessary, a plurality of storage devices 1000 and a plurality of storage devices 2000 may be arranged to form the storage device assembly 3000. Hereinafter, a storage device assembly and a manufacturing method thereof will be described in detail with reference to the accompanying drawings.

Figure 8:
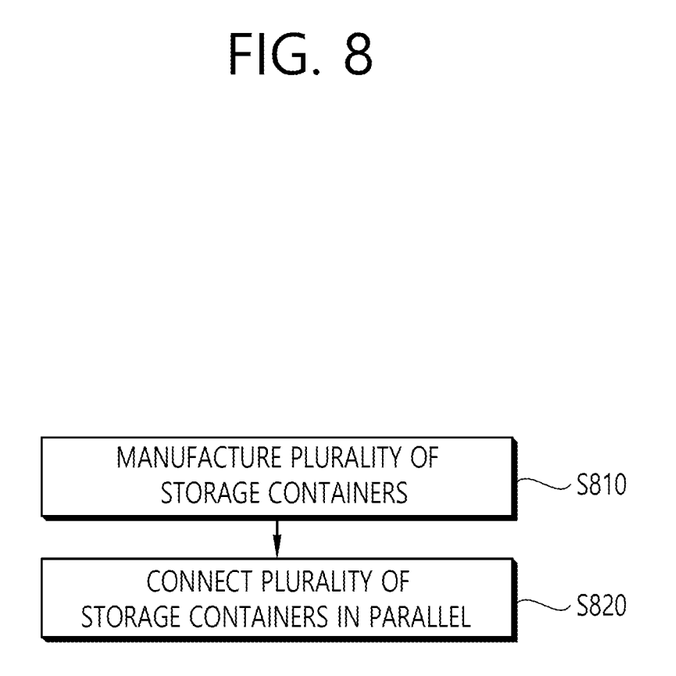
FIG. 8 is a flowchart illustrating a manufacturing method of the assembly of the vehicle fluid storage device according to the third embodiment.

FIG. 7 is a perspective view schematically illustrating an assembly of a vehicle fluid storage device according to a third embodiment, and FIG. 8 is a flowchart illustrating a manufacturing method of an assembly of the vehicle fluid storage device according to the third embodiment.

As illustrated in FIGS. 7 and 8, a vehicle fluid storage device assembly 3000 according to the third embodiment may be formed by coupling a plurality of storage devices 1000 and 2000.

In this case, the assembly 3000 of the storage device may include a plurality of low-pressure containers, a plurality of high-pressure containers, or a combination of low-pressure containers and high-pressure containers.

First, a plurality of storage devices are formed in order to manufacture the storage device assembly (3000) (S810). Thereafter, the plurality of storage devices 1000 and 2000 are arranged in parallel according to various types of mounting spaces such as internal combustion engines and electric vehicles where the assembly 3000 of the storage device is to be mounted, and thus, the connector coupling portion 600 of each of the storage devices 1000 and 2000 and a fluid line connection portion 700 are connected to each other (S820). The fluid line connection portion 700 may include branch pipes 710 corresponding to the number of storage devices 1000 and 2000 and a single connection pipe 720 connected to an external device.

However, this is for explanation of the present embodiment, and the shape of the fluid line connection portion 700 is not limited.

Meanwhile, in the present embodiments, although the injection of the holder 300 and the connector 200 after the formation of the storage container 100 is sequentially described, this is for explaining the present embodiment, and the order of forming the storage container 100 and manufacturing the injection assembly 400 may be changed.

Moreover, in the present embodiments, each of the storage devices 1000, 2000, and 3000 may have an outer diameter of 50 to 200 mm and a length of 500 to 1200 mm. However, the outer diameter size and length of each of the storage devices 1000, 2000, and 3000 are not limited.

According to the vehicle fluid storage device and the manufacturing method thereof according to the present disclosure, it is possible to reduce weight and a manufacturing cost while securing stability by coupling the metal or aluminum connector and the plastic container.

According to the vehicle fluid storage device and the manufacturing method thereof according to the present disclosure, it is possible to couple a plurality of vehicle fluid storage devices and increase a fluid storage capacity, and to easily arrange and mount the vehicle fluid storage devices in accordance with various types of mounting spaces such as internal combustion engines and electric vehicles.

Embodiments of the present disclosure described above and illustrated in the drawings should not be construed as limiting the technical idea of the present disclosure. The scope of protection of the present disclosure is limited only by matters described in claims, and a person having ordinary knowledge in the technical field of the present disclosure can improve and change the technical idea of the present disclosure in various forms. Therefore, these improvements and changes will fall within the scope of protection of the present disclosure as long as they are obvious to those skilled in the art.

What is claimed is:

1. A vehicle fluid storage device comprising:
    a storage container in which a storage space for fluid is formed and an opening is formed on one side or both sides; and
    an assembly including a connector disposed adjacent to the opening and forming a path through which the fluid flows into and out of the storage space, and a holder disposed between the storage container and the connector to connect the storage container and the connector,
    wherein the storage container and the holder are coupled to each other by rotation melting,
    wherein the holder includes:

a storage container support region configured to surround the outer wall of the storage container and form a rotational melting region;

a connector support region extending from the storage container support region and disposed to surround at least one region of the connector; and a connection region disposed between the storage container support region and the connector support region, wherein the storage container includes an insert ring adjacent to a rotational melting region of the storage container and the holder, wherein the insert ring is provided in the opening and configured to prevent deformation of the opening in the rotation melting of the storage container and the holder.

2. The vehicle fluid storage device of claim 1, wherein the storage container and holder include a plastic material, the connector includes at least one material of metal and aluminum, and the connector and the holder form the assembly by insert injection.

3. The vehicle fluid storage device of claim 2, wherein the storage container is formed by blow molding.

4. The vehicle fluid storage device of claim 1, further comprising a reinforcing layer disposed to surround at least one region of the storage container and the assembly to reinforce strength, wherein the reinforcing layer includes at least one of a carbon fiber composite material and a glass fiber composite material.

5. The vehicle fluid storage device of claim 1, wherein a burr accommodation space is formed between the outer wall of the storage container and the storage container support region to accommodate the burrs generated in the rotation melting.

6. The vehicle fluid storage device of claim 1, wherein the burr accommodation space includes a step formed at one end of the holder forming the connector support region.

7. The vehicle fluid storage device of claim 1, wherein at least one connection protrusion for coupling the connector and the holder is included between the connector support region and the connector.

8. The vehicle fluid storage device of claim 1, wherein the connector includes a connector body disposed adjacent to the opening, and a connector coupling portion extending from the connector body, and an insertion protrusion for coupling the connector and the holder is included in the connector coupling portion and the connection region of the holder.

9. The vehicle fluid storage device of claim 1, wherein the connector coupling portion further includes a support protrusion protruding from an outer wall of the connector coupling portion, and the connector support region surrounds the connector so that the support protrusion is exposed.

10. The vehicle fluid storage device of claim 9, wherein the support protrusion is used as a rib for fixing a jig in the rotation melting.

11. The vehicle fluid storage device of claim 1, wherein the insert ring includes at least one of plastic, metal, and aluminum.

12. The vehicle fluid storage device of claim 1, further comprising a connector connecting portion connected to the connector to connect the storage space and an external device.

13. The vehicle fluid storage device of claim 12, wherein an O-ring for maintaining airtightness between the connector and the connector coupling portion is disposed between the connector and the connector coupling portion.

* * * * *